Sept. 4, 1945.   H. W. KUGLER   2,384,037
BLIND RIVET PULLER
Filed Sept. 27, 1944   2 Sheets-Sheet 1

HERBERT W. KUGLER
INVENTOR.

BY
ATTORNEY.

Sept. 4, 1945.  H. W. KUGLER  2,384,037
BLIND RIVET PULLER
Filed Sept. 27, 1944  2 Sheets-Sheet 2

HERBERT W. KUGLER
INVENTOR.

BY
ATTORNEY.

Patented Sept. 4, 1945

2,384,037

UNITED STATES PATENT OFFICE 2,384,037

BLIND RIVET PULLER

Herbert W. Kugler, Los Angeles, Calif., assignor to Cherry Rivet Company, Los Angeles, Calif., a corporation of California Application September 27, 1944, Serial No. 556,074

8 Claims. (Cl. 218—19)

This invention relates to a puller for setting self-plugging blind rivets.

In the maintenance of aircraft and particularly in the maintenance and repair of combat aircraft, it is oftentimes necessary to make repairs under adverse conditions and at locations where it is difficult, if not impossible, to provide power operated tools. In the making of the required repairs, it is often necessary to install blind rivets of the type known as a self-plugging blind rivet. These rivets comprise a tubular rivet body with a head formed on the outer end. Within the bore and through the tubular body there is extended a mandrel having a small head on the inner end. This rivet assembly is pushed through the rivet receiving hole and the mandrel is then drawn outwardly. The inner head of the mandrel engages the inner end of the rivet body and expands the same into overlapping relation with the plates through which the holes are drilled, thus forming on the blind side of the plates a rivet head and clamping the plates between the head thus formed and the pre-formed head provided on the exterior of the rivet body.

The present invention is directed to a puller for drawing the mandrel, and is directed particularly to a hand tool which finds particular utility when employed as a repair tool at advanced bases and like locations where it is difficult to employ power operated tools.

It is an object of this invention to provide a puller for drawing the mandrel of the blind rivets of the type referred to and which is characterized by its small size and simplicity of construction.

It is also an object of my invention to provide a puller of the character described in the preceding paragraph which includes a rotatable member which, upon rotation, serves to pull the mandrel of the rivet and exert a counter-pressure against the pre-formed head of the rivet.

It is an additional object of this invention to provide a puller of the character set forth in the preceding paragraph which includes a nut and screw arrangement for drawing the mandrel and in which the nut is held against rotation by means of an outer holder which is provided with internal ribs for engaging the nut and preventing rotation thereof.

It is a still further object of my invention to provide a puller of the character set forth in the preceding paragraph which includes a removable mandrel engaging anvil permitting the ready substitution of various sizes of anvils, depending upon the size of the rivets being installed.

Other objects and advantages of this invention will be apparent from a study of the following specification, read in connection with the accompanying drawings, wherein.

Figure 6:
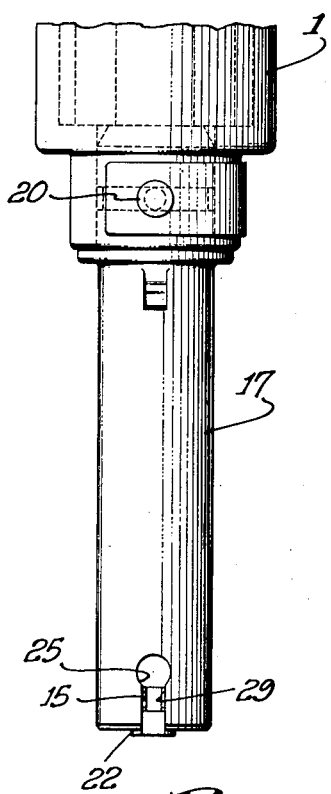
Fig. 6 is an enlarged elevational view of the lower portion of the puller as shown in Fig. 1.
Figure 7:
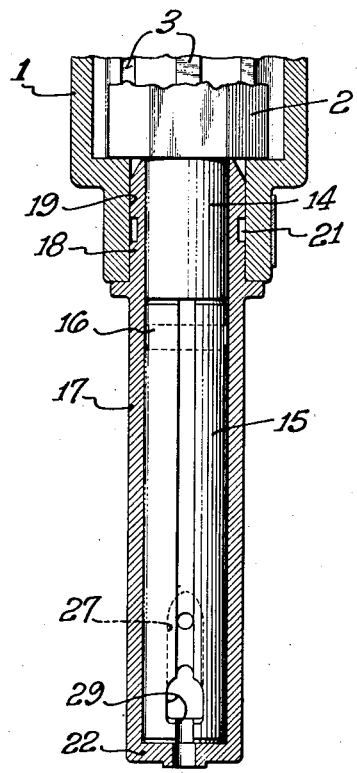
Fig. 7 is a longitudinal sectional view of the portion of the puller shown in Fig. 6, Fig. 7 being taken along a plane at right angles to the plane of Fig. 3.

Referring to the drawings, I have illustrated the preferred embodiment of this invention as comprising an outer housing or holder 1 within which there is slidably and non-rotatably mounted a drawing nut 2. The nut 2, as is shown in Fig. 6, is preferably formed with a hexagonal cross section. The interior of the holder 1 is provided with a plurality of radially inwardly extending ribs 3, these ribs defining guides along which the hexagonal cross section of the nut 2 may slide. This construction provides a material reduction in weight over that using a hexagonal bore for guiding the nut 2 and also reduces somewhat the frictional resistance to axial movement of the nut 2 within the holder 1.

The ribs 3 are terminated short of the upper end of the housing 1 to define internal shoulders 4 upon which a ball thrust bearing 5 is rested. The thrust bearing 5 is held within the holder 1 as by swaging the upper end of the holder 1 inwardly over a tapered portion 6 of bearing 5. The bearing 5 is used to journal a bolt 7 which is held against axial movement relative to the thrust bearing 5 as by means of a horseshoe washer 8. The bolt 7 is provided by preference with a hexagonal head 9 for receiving a conventional wrench. It may also be transversely bored as shown at 10 to receive a cross pin and it may also include a recess 11 having a square cross section for receiving the end of a socket wrench handle and like tools.

The bolt 7 includes a threaded portion 12 which engages female threads 13 formed in the nut 2 so that rotation of the bolt 7 may effect an axial movement of the nut 2 within the holder 1. Suitably secured to the nut 2 or, by preference, formed integrally therewith there is an anvil connector 14 comprising a short cylindrical member. This member is removably connected to an anvil 15 as by means of an interlocking tongue and groove arrangement 16 of the character shown in Fig. 2.

The anvil 15 is slidably received within a tubular anvil carrier or guide 17. The carrier 17 includes an upper portion 18 which is received within a bore 19 formed in the lower end of the housing 1 and is retained therein by suitable means such as a spring-pressed pin 20 which is received within an annular groove 21 formed in the portion 18. The lower end of the tubular anvil carrier 17 is closed as by means of a closure 22 adapted to bear against the pre-formed head 23 of a blind rivet 24. The carrier is suitably adapted to receive the protruding mandrel 26 of the blind rivet 24 as by being slotted as at 25.

The lower end of the anvil 15 is provided with suitable means for engaging the mandrel 26 to exert a tension force thereon. The particular means chosen will be determined in part by the construction of the mandrel 26. In the form shown, the anvil 15 is slotted as indicated at 27 to receive a pulling head 28 which is formed on the mandrel 26 of the form of rivet illustrated herein. A portion below the slot 27 is slotted as shown at 29 with a width substantially equal to the diameter of the mandrel 26 and less than the diameter of the head 28. This permits the device to be engaged with the rivet mandrel 26 as shown in Fig. 2 while providing a pulling connection between the anvil and the mandrel.

Figure 2:
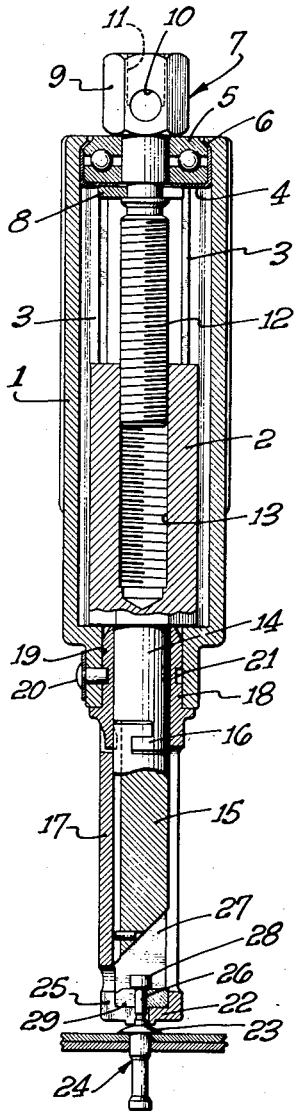
Fig. 2 is a longitudinal sectional view taken substantially along the line II—II of Fig. 1 and showing the parts in the relative positions they occupy at the beginning of a drawing operation.
Figure 1:
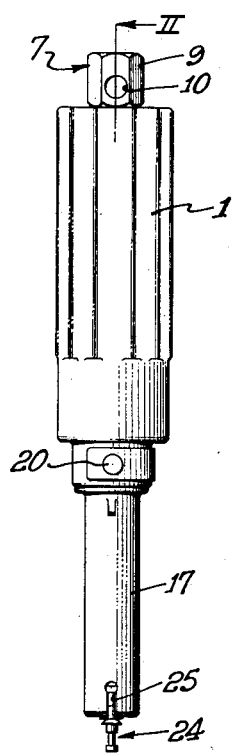
Fig. 1 is a side elevational view of the preferred embodiment of my invention.
Figure 3:
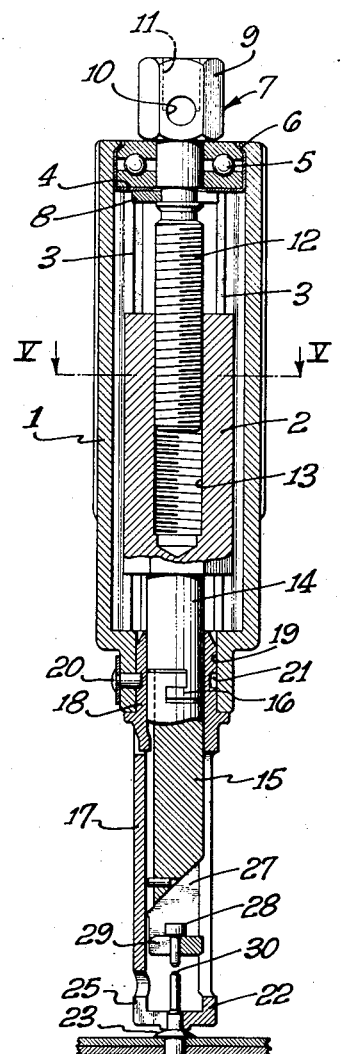
Fig. 3 is a view similar to Fig. 2 but illustrating the positions occupied by the parts at the time the rivet mandrel is completely drawn and the stem is broken.
Figure 4:
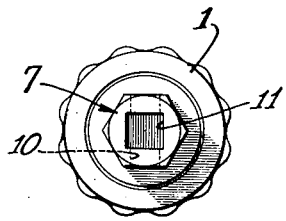
Fig. 4 is a top view of the assembly shown in Fig. 1.
Figure 5:
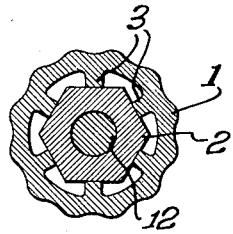
Fig. 5 is a cross sectional view taken substantially along the line V—V of Fig. 3.

With the parts placed as shown in Fig. 2, rotation of the bolt 7 draws the nut 2 upwardly and in so doing draws the anvil 15 upwardly and pulls the mandrel 26 sufficiently to set the blind rivet in the manner shown in Fig. 3 and break the mandrel at a reduced diameter portion 30 which is provided for that purpose.

The slot 29 provided in the anvil 15 for receiving the mandrel 26 is sized to conform to the particular size of blind rivet 24. The tool of the present invention may be adapted for various sized rivets by substituting other anvils 15 and other anvil carriers 17 selected to fit the particular rivet to be set. A new anvil and new anvil carrier may be installed by first releasing the spring-pressed pin 20, allowing the anvil carrier 17 to be slipped axially downward as viewed in Fig. 2 sufficiently far to expose the connection 16. The anvil 15 may then be disengaged from the portion 14 by reason of the removable connection 16. A new anvil 15 of the selected size may then be attached to the portion 14 and a new anvil carrier may be re-installed as shown in Fig. 2.

From the foregoing, it will be observed that this invention provides a blind rivet puller which is particularly adapted to field use by virtue of its small size and light weight rugged construction. Particular attention is directed to the ease with which the anvil and the anvil carrier are removed and replaced to permit the ready adaptation of the tool to rivets of different sizes. The device is also simple in operation since the mere rotation of the bolt with respect to the outer case serves to draw the rivet mandrel while exerting an inward pressure on the head of the rivet to hold the rivet in place and securely clamp the plates together in preparation for the setting of the rivet.

While the preferred embodiment of the invention has been shown and described, it is not to be limited to any of the details of construction shown and described, but only to the extent set forth in the appended claims.

I claim:

1. In a puller for setting blind rivets having a headed body and a retractable mandrel, the combination of: a housing including a portion engageable with the head of said rivet body, said housing having a longitudinal bore therein for receiving said mandrel; an anvil slidable in said bore and having means thereon for engaging said mandrel; a nut slidable in said bore; means holding said nut against rotation relative to said housing; means attaching said anvil to said nut; a bolt threadedly engaging said nut; and means on said housing mounting said bolt for rotation relative thereto, said last-named means serving also to hold said bolt against axial movement relative to said housing, whereby rotation of said bolt moves said nut and anvil longitudinally in said bore to retract said mandrel.

2. In a puller for setting blind rivets having a headed body and a retractable mandrel, the combination of: a housing including a portion engageable with the head of said rivet body, said housing having a longitudinal bore therein for receiving said mandrel; an anvil slidable in said bore and having means thereon for engaging said mandrel; a nut slidable in said bore; means holding said nut against rotation relative to said housing; attachment means removably attaching said anvil to said nut; a bolt threadedly engaging said nut; and means on said housing mounting said bolt for rotation relative thereto, said last-named means serving also to hold said bolt against axial movement relative to said housing, whereby rotation of said bolt moves said nut and anvil longitudinally in said bore to retract said mandrel, and whereby said attachment means permits the removal of said anvil and the substitution therefor of another anvil of a different size for setting rivets of a corresponding different size.

3. In a puller for setting blind rivets having a headed body and a retractable mandrel, the combination of: a housing; an anvil guide secured to said housing and including a portion engageable with the head of said rivet body, said guide having a longitudinal bore formed therein for receiving said mandrel; an anvil slidable in said bore; means on said anvil for engaging said mandrel; a nut means of non-circular cross section, said housing having formed therein a longitudinal bore of non-circular cross section for receiving said nut means to hold said nut means against rotation while permitting sliding movement thereof; cooperating means on said nut means and said anvil for removably attaching said anvil to said nut means; a bolt in said housing threadedly engaging said nut means; and a thrust bearing on said housing journaling said bolt for rotation while preventing axial movement thereof.

4. In a puller for setting blind rivets having a headed body and a retractable mandrel, the combination of: a housing; an anvil guide secured to said housing and including a portion engageable with the head of said rivet body, said guide having a longitudinal bore formed therein for receiving said mandrel; an anvil slidable in said bore; means on said anvil for engaging said mandrel; a nut means of non-circular cross section, said housing having formed therein a longitudinal bore of non-circular cross section for receiving said nut means to hold said nut means against rotation while permitting sliding movement thereof; cooperating means on said nut means and said anvil for removably attaching said anvil to said nut means; a bolt in said housing threadedly engaging said nut means; a thrust bearing on said housing journaling said bolt for rotation while preventing axial movement thereof; and an external head of hexagonal cross section on said bolt, said head having a transverse pin receiving bore formed therein and having also formed therein an axially extending recess of rectangular cross section.

5. In a puller for setting blind rivets having a headed body and a retractable mandrel, the combination of: a housing; an anvil guide on said housing and including a portion engageable with the head of said rivet body, said guide having a longitudinal bore formed therein for receiving said mandrel; an anvil slidable in said bore; means on said anvil for engaging said mandrel; a nut means of non-circular cross section, said housing having formed therein a longitudinal bore of non-circular cross section for receiving said nut means to hold said nut means against rotation while permitting sliding movement thereof; cooperating means on said nut means and said anvil for removably attaching said anvil to said nut means; a bolt in said housing threadedly engaging said nut means; a thrust bearing on said housing journaling said bolt for rotation while preventing axial movement thereof; and means detachably securing said anvil guide to said housing to facilitate removal of said anvil from said nut means.

6. In a blind rivet puller including a housing, a nut slidably and non-rotatably mounted in said housing, and a bolt threadedly engaging said nut for drawing said nut axially through said housing, the improvement consisting of a plurality of longitudinally extending internal ribs on said housing, said ribs terminating at equal distances from a central longitudinal axis of said housing, and said nut having a regular polygonal cross section defined by plane surfaces equal in number to the number of said ribs and spaced to be closely received in the central space defined by said ribs, said ribs engaging said surfaces to hold said nut against rotation while permitting sliding movement thereof.

7. In a puller for setting blind rivets having a headed body and a retractable mandrel, the combination of: a housing; an anvil guide secured to said housing and including a portion engageable with the head of said rivet body, said guide having a longitudinal bore formed therein for receiving said mandrel; an anvil slidable in said bore; means on said anvil for engaging said mandrel; a nut means of non-circular cross section, said housing having formed therein a longitudinal bore of non-circular cross section for receiving said nut means to hold said nut means against rotation while permitting sliding movement thereof; cooperating means on said nut means and said anvil comprising complementary inter-engageable halves of a tongue and groove connection for removably attaching said anvil to said nut means; a bolt in said housing threadedly engaging said nut means; and a thrust bearing on said housing journaling said bolt for rotation while preventing axial movement thereof.

8. In a puller for setting blind rivets having a headed body and a retractable mandrel, the combination of: a housing; an anvil guide secured to said housing and including a portion engageable with the head of said rivet body, said guide having a longitudinal bore formed therein; an anvil slidable in said bore; means on said anvil for engaging said mandrel; a nut means of non-circular cross section, said housing having formed therein a longitudinal bore of non-circular cross section for receiving said nut means to hold said nut means against rotation while permitting sliding movement thereof; cooperating means on said nut means and said anvil for removably attaching said anvil to said nut means; a bolt in said housing threadedly engaging said nut means; a thrust bearing on said housing journaling said bolt for rotation while preventing axial movement thereof; and an external head of hexagonal cross section on said bolt, said head having a transverse pin receiving bore formed therein and having also formed therein an axially extending recess of rectangular cross section.

HERBERT W. KUGLER.